(12) United States Patent
Anzawa

(10) Patent No.: US 10,711,711 B2
(45) Date of Patent: Jul. 14, 2020

(54) VEHICLE CONTROLLER

(71) Applicant: TOYOTA JIDOSHA KABUSHIKI KAISHA, Toyota-shi, Aichi-ken (JP)

(72) Inventor: Takumi Anzawa, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/424,593

(22) Filed: May 29, 2019

(65) Prior Publication Data
US 2020/0018248 A1 Jan. 16, 2020

(30) Foreign Application Priority Data

Jul. 12, 2018 (JP) ................................ 2018-132282

(51) Int. Cl.
*F02D 41/00* (2006.01)
*F02D 41/10* (2006.01)
*F02D 41/04* (2006.01)

(52) U.S. Cl.
CPC ....... *F02D 41/0007* (2013.01); *F02D 41/045* (2013.01); *F02D 41/10* (2013.01); *F02D 2200/0406* (2013.01); *F02D 2200/1015* (2013.01); *F02D 2200/602* (2013.01); *F02D 2250/24* (2013.01)

(58) Field of Classification Search
CPC .... F02D 41/00; F02D 41/0007; F02D 41/045; F02D 41/10; F02D 2200/1015; F02D 2200/0406; F02D 2200/602; F02D 2250/24
See application file for complete search history.

(56) References Cited

U.S. PATENT DOCUMENTS

| 8,579,762 | B2* | 11/2013 | Yacoub | F16H 61/061 477/115 |
| 10,422,289 | B2* | 9/2019 | Xiao | F02B 37/16 |
| 2019/0145342 | A1* | 5/2019 | Jacobsson | F02D 41/0007 701/104 |

FOREIGN PATENT DOCUMENTS

| JP | 2012-030664 A | 2/2012 |
| JP | 2017-144979 A | 8/2017 |

* cited by examiner

*Primary Examiner* — Hieu T Vo
(74) *Attorney, Agent, or Firm* — Oliff PLC

(57) ABSTRACT

A vehicle controller includes a controlling section configured to control a torque applying mechanism. The controlling section is configured to execute a negative torque control by using the torque applying mechanism when execution conditions are satisfied. The execution conditions include a condition that an increase amount per predetermined time of the boost pressure has become greater than a preset boost pressure determination value. The negative torque control is a control to set the rotational torque applied to the crankshaft by the torque applying mechanism to a negative value that is on the negative side of a value immediately before the start of the negative torque control.

7 Claims, 5 Drawing Sheets

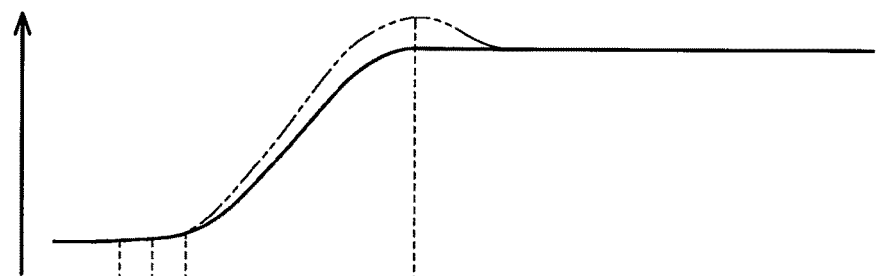
Fig.6A Engine Rotational Speed
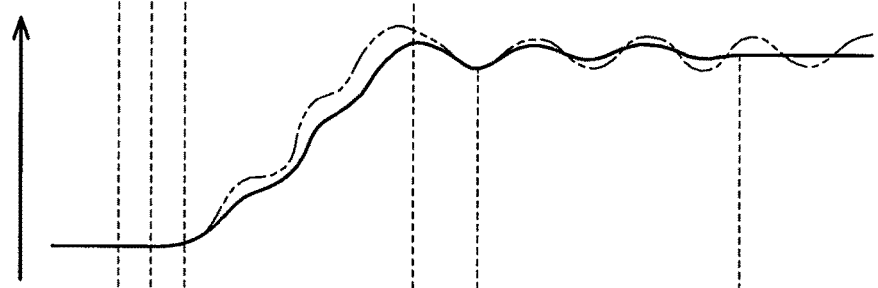
Fig.6B Rotational Speed of Output Shaft of First Motor Generator
Fig.6C Accelerator Operation Amount ACC
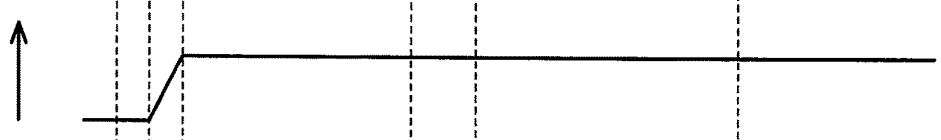
Fig.6D Boost Pressure P
Fig.6E Negative Torque Control Execution Flag
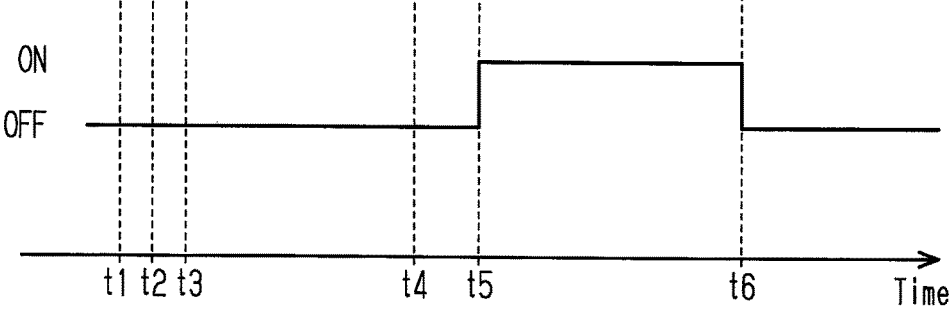
Fig.6F Vibration Suppression Control Execution Flag

VEHICLE CONTROLLER

BACKGROUND

1. Field

The present disclosure relates to a vehicle controller.

2. Description of Related Art

Japanese Laid-Open Patent Publication No. 2017-144979 discloses a hybrid vehicle. The hybrid vehicle includes an internal combustion engine that drives the vehicle. The internal combustion engine has a forced-induction device that compresses and supplies intake air. In the hybrid vehicle, the forced-induction device is activated in association with the accelerator operation by the driver. The activated forced-induction device compresses intake air and delivers the compressed air into the cylinders.

In an internal combustion engine with a forced-induction device such as that in the above-described hybrid vehicle, the target pressure on the downstream side of the forced-induction device in the intake passage (target forced-induction pressure) is set in accordance with the accelerator operation by the driver. However, there may be a certain time lag before the compressor wheel of the forced-induction device achieves the target pressure. Thus, when the driver quickly depresses the accelerator, the above-described time lag causes the rotational speed of the turbine of the forced-induction device to overshoot, and the rotational speed of the internal combustion engine may be increased excessively. Such an excessive increase in the engine rotational speed is not favorable since it shakes and vibrates the vehicle and generates noise.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle controller is configured to control a vehicle. The vehicle includes an internal combustion engine including a forced-induction device, a boost pressure sensor that detects, as a boost pressure, a pressure in a section of an intake passage of the internal combustion engine on a downstream side of the forced-induction device, and a torque applying mechanism that applies a rotational to a crankshaft of the internal combustion engine. The controller comprising a controlling section configured to control the torque applying mechanism. The controlling section is configured to execute a negative torque control by using the torque applying mechanism when execution conditions are satisfied. The execution conditions include a condition that an increase amount per predetermined time of the boost pressure has become greater than a preset boost pressure determination value. The negative torque control is a control to set the rotational torque applied to the crankshaft by the torque applying mechanism to a negative value that is on a negative side of a value immediately before start of the negative torque control.

With the above-described configuration, when the increase amount per predetermined time of the boost pressure is greater than the boost pressure determination value, in other words, when there is a possibility that the boost pressure will increase rapidly and then the rotational speed of the internal combustion engine will increase excessively, a negative rotational torque is applied to the crankshaft of the internal combustion engine. Therefore, the increase in the rotational speed of the internal combustion engine becomes moderate, and excessive increase in the rotational speed is unlikely to occur. As a result, shaking, vibration, and noise of the vehicle caused by excessive increase in the rotational speed of the internal combustion engine are limited.

In the above-described configuration, the execution conditions may include a condition that an increase amount per predetermined time of an accelerator operation amount detected by an accelerator operation amount sensor is greater than a preset accelerator operation amount determination value.

If the accelerator pedal is operated abruptly by the driver, it is likely that the rotational speed of the internal combustion engine will increase excessively immediately thereafter. The above-described configuration employs, as one of the execution conditions of the negative torque control, the condition related to the increase amount of the accelerator operation amount ACC. This allows the negative torque control to be executed under appropriate situations and prevents the negative torque control from being executed unnecessarily.

In the above-described configuration, the vehicle includes, as the torque applying mechanism, a motor generator that is driveably coupled to the internal combustion engine. The controlling section may be a motor controlling section configured to control operation of the motor generator.

In the above-described configuration, the first motor generator assists the operation of the internal combustion engine and generates power using the torque from the internal combustion engine. Therefore, the motor generator is able to be relatively finely controlled. Employing the motor generator as the negative torque applying mechanism as in the above-described configuration allows the negative rotational torque applied to the crankshaft in the negative torque control to be properly controlled.

In the above-described configuration, the vehicle includes, as the torque applying mechanism, a motor generator drivably coupled to the internal combustion engine, and a rotation sensor that detects a rotational speed of an output shaft of the motor generator. The controller may include a motor controlling section and a misfire determining section. The motor controlling section is configured to execute a vibration suppression control on condition that the negative torque control is not being executed and a fluctuation range of the rotational speed of the output shaft of the motor generator detected by the rotation sensor is greater than a preset reference value. The misfire determining section is configured to determine a misfire of the internal combustion engine on condition that the fluctuation range of the rotational speed of the internal combustion engine is greater than a preset misfire determination value. The vibration suppression control is a control to set the rotational torque applied to the crankshaft by the motor generator to a negative value that is on a negative side of a value immediately before start of the vibration suppression control. The misfire determining section is configured to change the misfire determination value to a smaller value when change conditions are satisfied than when the change conditions are not satisfied. The change conditions include a condition that the negative torque control or the vibration suppression control is being executed.

In the above-described configuration, when the fluctuation range of the rotation speed of the output shaft of the motor generator is great, the vibration suppression control is executed, so that the motor generator applies a negative rotational torque to the crankshaft of the internal combustion engine. When the motor generator is applying a negative rotational torque to the crankshaft of the internal combustion engine, the fluctuation range of the rotational speed of the internal combustion engine tends to be smaller. Likewise, the fluctuation range of the rotational speed of the internal combustion engine tends to decrease when the negative torque control is being executed. In the above-described configuration, the misfire determination value is set to a relatively small value in a situation in which the fluctuation range of the rotational speed of the internal combustion engine is likely to decrease, so that a misfire of the internal combustion engine is properly determined.

In the above-described configuration, the vibration suppression control causes a negative rotation torque to be greater on the negative side as the fluctuation range of the rotational speed of the output shaft of the motor generator increases. The change conditions include a condition that a change amount per predetermined time of the boost pressure has become greater than a preset boost pressure threshold.

With the above-described configuration, when the change amount per predetermined time of the boost pressure is great, there is a high possibility that the rotational speed of the internal combustion engine may increase or decrease rapidly. When the engine rotational speed increases or decreases rapidly, the rotational torque acting on the output shaft of the motor generator from the crankshaft also changes rapidly. Thus, the fluctuation range of the rotational speed of the output shaft of the motor generator tends to be great. In the vibration suppression control, if a great rotational torque is applied to the negative side in accordance with a great value of the fluctuation range of the rotational speed of the output shaft of the motor generator, the crankshaft will be pushed in the negative rotation direction by a corresponding amount. The fluctuation range of the rotational speed of the internal combustion engine thus will become significantly small. With this configuration, the misfire determination value is set to a small value only under a situation where the fluctuation range of the engine rotational speed may become significantly small.

In the above-described configuration, the vehicle may include the internal combustion engine, a damper that is coupled to the crankshaft of the internal combustion engine to suppress vibration of the crankshaft, a gear mechanism that is coupled to the damper and transmits a driving force of the internal combustion engine via a plurality of gears, and a motor generator that performs as the torque applying mechanism coupled to the gear mechanism.

In the above-described configuration, when the rotational speed of the internal combustion engine is increased excessively, the damper is excessively twisted, which generates a reaction force that acts to restore the original state of the damper. Repetition of such twisting and reaction force causes the driving force transmitted from the internal combustion engine to the gear mechanism to be unstable, so that the driving force fluctuates in a vibrating manner. The gears in the gear mechanism then may collide with each other to generate noise. In the above-described configuration, the motor generator coupled to the gear mechanism executes the negative torque control to restrict repetitive collision of the gears in the gear mechanism, thereby suppressing the generation of the noise between the gears.

In another general aspect, a vehicle controller configured to control a vehicle is provided. The vehicle includes an internal combustion engine including a forced-induction device, a motor generator, and a rotation sensor. The motor generator is drivably coupled to the internal combustion engine. The motor generator performs as a torque applying mechanism that applies a rotational to a crankshaft of the internal combustion engine. The rotation sensor detects a rotational speed of an output shaft of the motor generator. The controller includes a motor controlling section and a misfire determining section. The motor controlling section is configured to execute a vibration suppression control on condition that a fluctuation range of the rotational speed of the output shaft of the motor generator detected by the rotation sensor is greater than a preset reference value. The misfire determining section is configured to determine a misfire of the internal combustion engine on condition that the fluctuation range of the rotational speed of the internal combustion engine is greater than a preset misfire determination value. The vibration suppression control is a control to set the rotational torque applied to the crankshaft by the motor generator to a negative value that is on a negative side of a value immediately before start of the vibration suppression control. The misfire determining section is configured to change the misfire determination value to a smaller value when change conditions are satisfied than when the change conditions are not satisfied, the change conditions including a condition that the vibration suppression control is being executed.

Other features and aspects will be apparent from the following detailed description, the drawings, and the claims.

BRIEF DESCRIPTION OF THE DRAWINGS

FIG. 6A is a timing diagram showing changes in the rotational speed of the internal combustion engine.

FIG. 6B is a timing diagram showing changes in the rotational speed of the output shaft of a first motor generator.

FIG. 6C is a timing diagram showing changes in an accelerator operation amount.

FIG. 6D is a timing diagram showing changes in forced-induction pressure.

FIG. 6E is a timing diagram showing changes in a negative torque control execution flag.

FIG. 6F is a timing diagram showing changes in a vibration suppression control execution flag.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of the present disclosure will now be described with reference to FIGS. 1 to 6E. First, a schematic configuration of a vehicle 100 equipped with a controller 90 of the embodiment will be described.

Figure 1:
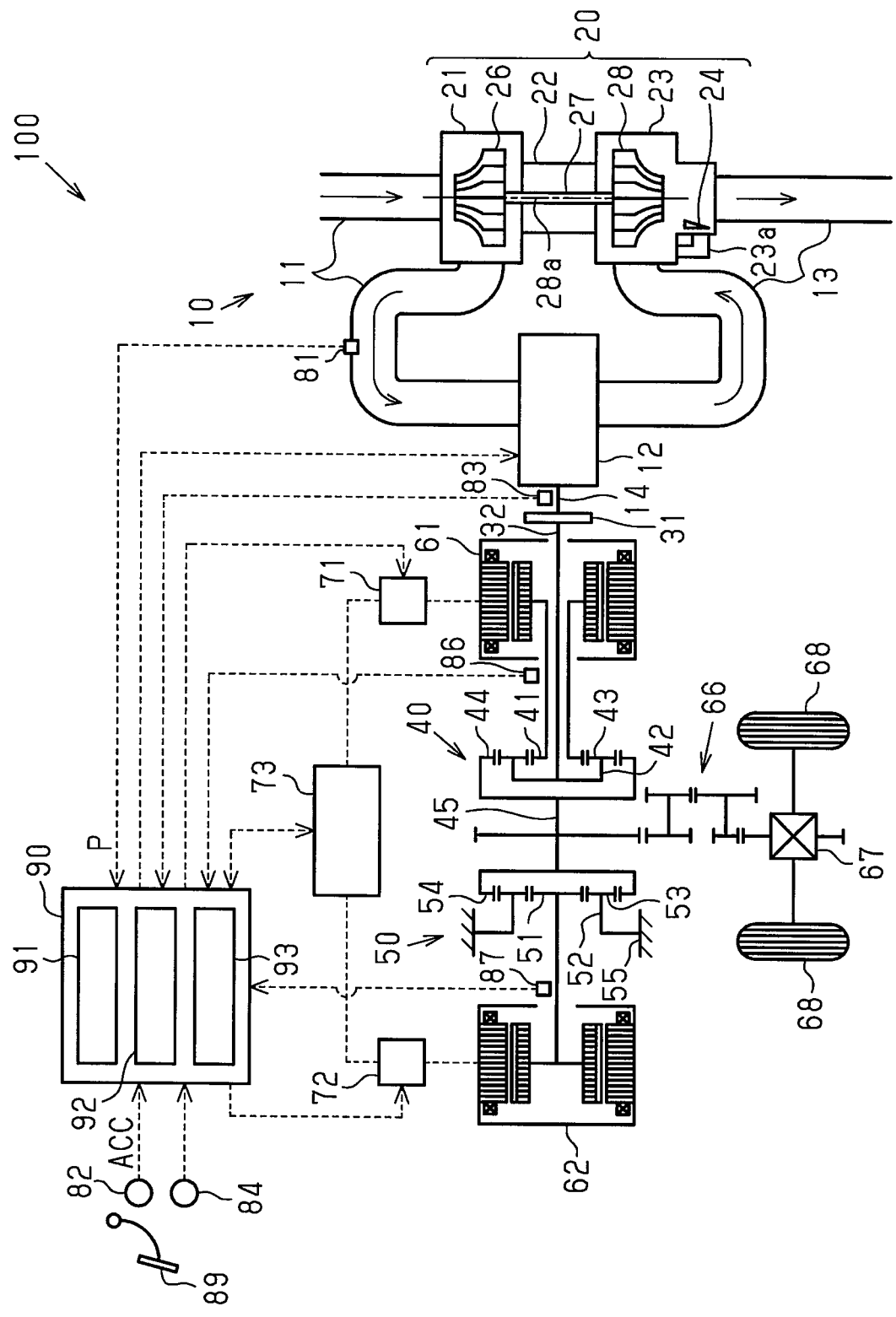
FIG. 1 is a diagrammatic view showing a vehicle in which a controller according to an embodiment is used.

As shown in FIG. 1, the vehicle 100 is equipped with an internal combustion engine 10 configured to drive the vehicle 100. The internal combustion engine 10 has an intake passage 11 configured to introduce intake air from outside the internal combustion engine 10. The intake passage 11 is connected to cylinders 12, which mix fuel with the intake air and burns the mixture. Each cylinder 12 accommodates a piston that reciprocates in the cylinder 12 as fuel burns, and the piston is connected to a crankshaft 14. When the fuel and the intake air burn in the cylinder 12, the crankshaft 14 rotates. The cylinders 12 are connected to an exhaust passage 13 configured to discharge exhaust gas from the cylinder 12.

The internal combustion engine 10 has a forced-induction device configured to compress intake air. The forced-induction device is a turbocharger 20 in the present embodiment. The turbocharger 20 has a compressor housing 21, which is installed in the middle of the intake passage 11. The turbocharger 20 also has a turbine housing 23, which is installed in a section of the exhaust passage 13. The turbocharger 20 further includes a bearing housing 22, which connects the compressor housing 21 and the turbine housing 23 to each other.

The turbine housing 23 accommodates a turbine wheel 28, which is rotated by flow of exhaust gas. The turbine wheel 28 is rotational about a rotation axis 28a of the turbine wheel 28. The turbine wheel 28 is connected to one end, or a first end, of a shaft 27. The central portion of the shaft 27 is accommodated in the bearing housing 22. The shaft 27 is rotationally supported by a bearing (not shown). The rotation axis of the shaft 27 is coaxial with the rotation axis 28a of the turbine wheel 28. The other end, or a second end, of the shaft 27 is connected to a compressor wheel 26. The compressor wheel 26 is accommodated in the compressor housing 21. The rotation axis of the compressor wheel 26 is coaxial with the rotation axis 28a of the turbine wheel 28. The compressor wheel 26 rotates with rotation of the turbine wheel 28 to compress the intake air and supplies it to the cylinder 12.

The turbine housing 23 of the turbocharger 20 has a bypass passage 23a, which connects the upstream side and the downstream side of the turbine wheel 28 to each other. The turbine housing 23 further rotationally supports a wastegate 24. When the wastegate 24 is rotated by an actuator (not shown), the bypass passage 23a inside the turbine housing 23 is selectively opened and closed.

A boost pressure sensor 81 is attached to a section of the intake passage 11 on the downstream side of the compressor housing 21. The boost pressure sensor 81 is configured to detect a boost pressure P, which is the pressure in the section of the intake passage 11 on the downstream side of the compressor housing 21. Also, a rank angle sensor 83, which is configured to detect the rotational angle of the crankshaft 14, is provided in the vicinity of crankshaft 14.

A damper 31 configured to suppress vibration of the crankshaft 14 is connected to the crankshaft 14 of the internal combustion engine 10. The damper 31 uses a mass and a spring to absorb torsional vibration of the crankshaft 14 generated due to factors such as torque fluctuations. The damper 31 is connected to a driving force distribution-integration mechanism 40 configured to distribute the driving force of the internal combustion engine 10 via a coupling shaft 32.

The driving force distribution-integration mechanism 40 is a planetary gear mechanism and includes a sun gear 41, which is an external gear, and a ring gear 44, which is an internal gear coaxially arranged with the sun gear 41. Pinion gears 43 meshing with the sun gear 41 and the ring gear 44 are provided between the sun gear 41 and the ring gear 44. The pinion gears 43 are rotationally supported by a carrier 42. The pinion gears 43 are also allowed to orbit when the carrier 42 rotates. The carrier 42 of the driving force distribution-integration mechanism 40 is connected to the crankshaft 14. The sun gear 41 of the driving force distribution-integration mechanism 40 is connected to the output shaft of a first motor generator 61. Therefore, the output shaft of the first motor generator 61 is coupled to the crankshaft 14 of the internal combustion engine 10 via the driving force distribution-integration mechanism 40.

When the driving force of the internal combustion engine 10 is input to the carrier 42, the driving force is distributed to the sun gear 41 and the ring gear 44. When the driving force of the internal combustion engine 10 that is transmitted via the sun gear 41 is input to the output shaft of the first motor generator 61, the first motor generator 61 performs as a generator.

In contrast, when the first motor generator 61 is caused to perform as an electric motor, the driving force of the first motor generator 61 is input to the sun gear 41. The driving force of the first motor generator 61 input to the sun gear 41 is distributed to the carrier 42 and the ring gear 44. When the driving force of the first motor generator 61 that is transmitted via the carrier 42 is input to the crankshaft 14 of the internal combustion engine 10, the crankshaft 14 is rotated. That is, in the present embodiment, the first motor generator 61 is a torque applying mechanism that applies rotational torque to the crankshaft 14. Also, the driving force distribution-integration mechanism 40 is a gear mechanism that transmits the driving force of internal combustion engine 10.

The ring gear 44 of the driving force distribution-integration mechanism 40 is connected to a transmission mechanism 66 via a ring gear shaft 45. The transmission mechanism 66 transmits driving force through multiple gears. The transmission mechanism 66 is connected to driven wheels 68 via a differential 67.

The ring gear 44 of the driving force distribution-integration mechanism 40 is connected to a reduction mechanism 50 via the ring gear shaft 45. The reduction mechanism 50 is a planetary gear mechanism and includes a sun gear 51, which is an external gear, and a ring gear 54, which is an internal gear coaxially arranged with the sun gear 51. Pinion gears 53 meshing with the sun gear 51 and the ring gear 54 are provided between the sun gear 51 and the ring gear 54. The pinion gears 53 are rotationally supported by a carrier 52. The carrier 52 is fixed to a case 55 of the reduction mechanism 50. The pinion gears 53 are thus unable to orbit. The ring gear 54 of the reduction mechanism 50 is connected to the ring gear shaft 45. The sun gear 51 of the reduction mechanism 50 is connected to the output shaft of a second motor generator 62, which is configured to drive the vehicle 100.

The second motor generator 62 performs as a generator when the vehicle 100 is decelerated, so that regenerative braking force is able to be generated in the vehicle 100 in accordance with the amount of power generated by the second motor generator 62.

In contrast, when the second motor generator 62 performs as an electric motor, the driving force of the second motor generator 62 is input to the driven wheels 68 via the reduction mechanism 50, the ring gear shaft 45, the transmission mechanism 66, and the differential 67. The driven wheels 68 are thus rotated by the driving force of the second motor generator 62.

The first motor generator 61 exchanges electric power with a battery 73 through a first inverter 71. The second motor generator 62 exchanges electric power with the battery 73 through a second inverter 72.

A first rotation sensor 86 is provided in the vicinity of the output shaft of the first motor generator 61. The first rotation sensor 86 is configured to detect the rotational speed of the output shaft of the first motor generator 61. Also, a second rotation sensor 87 is provided in the vicinity of the output shaft of the second motor generator 62. The second rotation sensor 87 is configured to detect the rotational speed of the output shaft of the second motor generator 62.

As shown in FIG. 1, the controller 90 of the vehicle 100 receives a signal indicating the boost pressure P from the boost pressure sensor 81. Further, the controller 90 of the vehicle 100 receives a signal indicating an accelerator operation amount ACC from an accelerator operation amount sensor 82, which is configured to detect the accelerator operation amount ACC, which is an operation amount of an accelerator pedal 89 by the driver. The controller 90 of the vehicle 100 receives a signal indicating the rotational angle of the crankshaft 14 from the crank angle sensor 83. Further, the controller 90 of the vehicle 100 receives a signal indicating the speed of the vehicle 100 from a vehicle speed sensor 84, which is configured to detect the speed of the vehicle 100. The controller 90 of the vehicle 100 receives a signal indicating the rotational speed of the output shaft of the first motor generator 61 from the first rotation sensor 86. The controller 90 of the vehicle 100 also receives a signal indicating the rotational speed of the output shaft of the second motor generator 62 from the second rotation sensor 87.

The controller 90 of the vehicle 100 includes an engine controlling section 91 configured to control the internal combustion engine 10, a motor controlling section 92 configured to control the first motor generator 61 and the second motor generator 62, and a misfire determining section 93 configured to determine a misfire in the internal combustion engine 10. The engine controlling section 91 calculates a target engine torque, which is a target value of the output of the internal combustion engine 10, based on the accelerator operation amount ACC and the like. The engine controlling section 91 also calculates a target rotational speed, which is a target value of the engine rotational speed, or the number of revolutions per unit time of the crankshaft 14 of the internal combustion engine 10. Based on the target engine torque and the target rotational speed, the engine controlling section 91 controls valves such as the throttle valve configured to regulate the intake air amount flowing through the intake passage 11 and the fuel injection valves configured to supply fuel to the cylinders 12, thereby controlling the internal combustion engine 10.

The motor controlling section 92 calculates a first target torque, which is a target value of the driving/regenerative torque of the first motor generator 61, based on parameters such as the accelerator operation amount ACC. The motor controlling section 92 controls the first motor generator 61 based on the first target torque. Also, the motor controlling section 92 calculates a second target torque, which is a target value of the driving/regenerative torque of the second motor generator 62, based on parameters such as the accelerator operation amount ACC. The motor controlling section 92 controls the second motor generator 62 based on the second target torque.

Next, the execution start determination process of a negative torque control by the first motor generator 61 will be described. The execution start determination process is executed by the controller 90. The controller 90 repeatedly executes the execution start determination process of the negative torque control at predetermined intervals from when the system activation switch of the vehicle 100 is turned ON to activate the controller 90 until when the system activation switch is turned OFF so that the operation of the controller 90 ends. The system activation switch may also be referred to as a start switch or a main switch. When the controller 90 starts operating, a negative torque control execution flag and an accelerator operation amount rapid increase flag are OFF.

Figure 2:
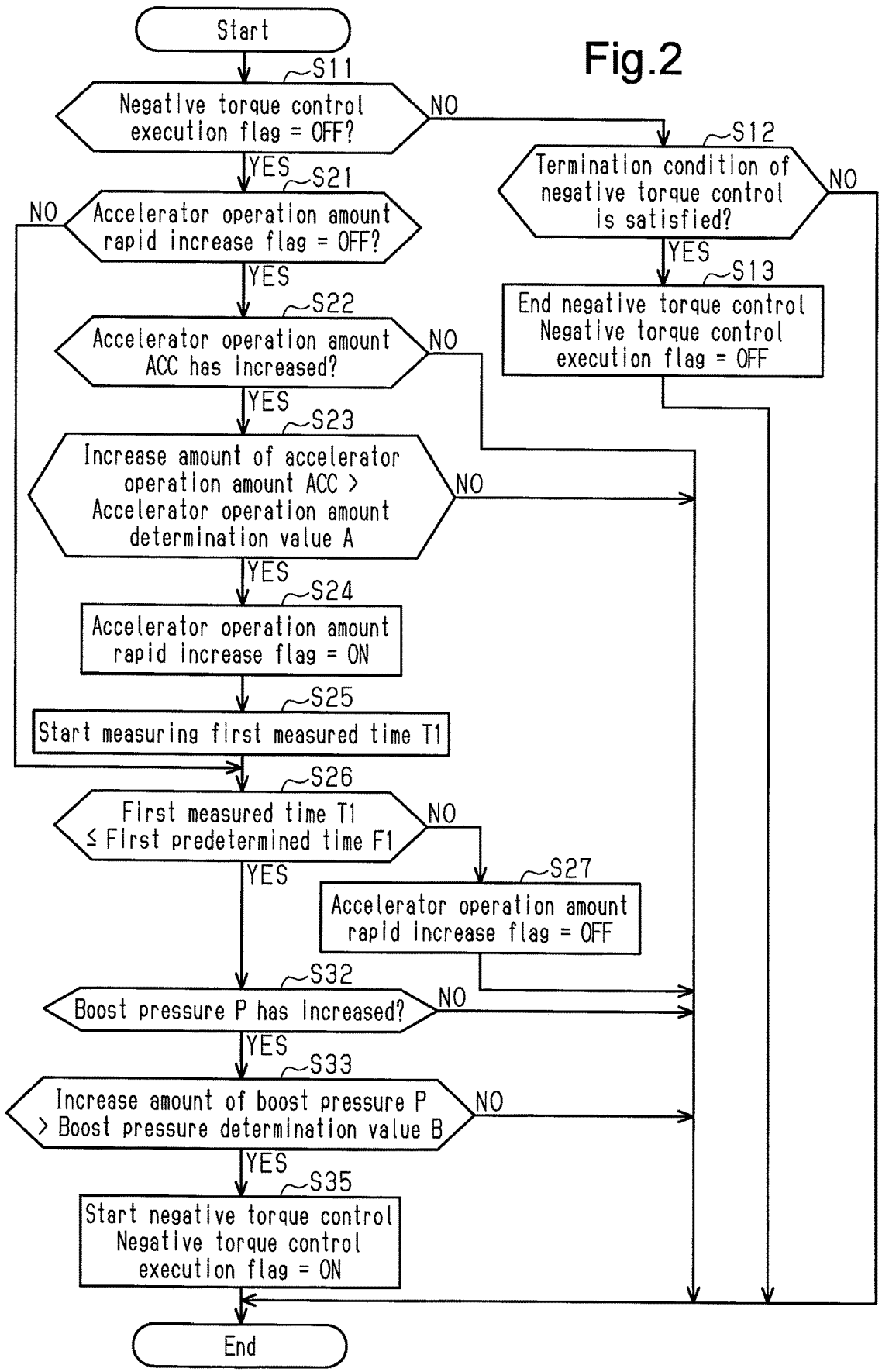
FIG. 2 is a flowchart showing an execution start determination process of a negative torque control.

As shown in FIG. 2, the controller 90 executes the process of step S11 when starting the execution start determination process of the negative torque control. In step S11, the controller 90 determines whether the negative torque control execution flag is OFF. When determining in step S11 that the negative torque control execution flag is OFF (S11: YES), the controller 90 advances the process to step S21.

In step S21, the controller 90 determines whether the accelerator operation amount rapid increase flag, which indicates that the accelerator operation amount ACC has rapidly increased, is OFF. When determining in step S21 that the accelerator operation amount rapid increase flag is ON (S21: NO), the controller 90 advances the process to step S26. In contrast, when determining in step S21 that the accelerator operation amount rapid increase flag is OFF (S21: YES), the controller 90 advances the process to step S22.

In step S22, the controller 90 determines whether the accelerator operation amount ACC has increased. The controller 90 determines that the accelerator operation amount ACC has increased if the currently detected accelerator operation amount ACC is greater than the previously detected accelerator operation amount ACC. When determining in step S22 that the accelerator operation amount ACC has not increased (S22: NO), the controller 90 ends the execution start determination process of the current negative torque control. In contrast, when determining in step S22 that the accelerator operation amount ACC has increased (S22: YES), the controller 90 advances the process to step S23.

In step S23, the controller 90 determines whether the increase amount per predetermined time of the accelerator operation amount ACC is greater than a preset accelerator operation amount determination value A. The amount of increase per predetermined time of the accelerator operation amount ACC is the absolute value of the difference between the currently detected accelerator operation amount ACC and the previously detected accelerator operation amount ACC. The accelerator operation amount determination value A is set to such a value that the internal combustion engine 10 may be revved up after the accelerator operation amount ACC is repeatedly increased at predetermined intervals for a certain time by the accelerator operation amount determination value A each time. The accelerator operation amount determination value A is obtained through experiments or simulations in advance. When determining in step S23 that the increase amount per predetermined time of the accelerator operation amount ACC is less than or equal to the preset accelerator operation amount determination value A (S23: NO), the controller 90 ends the execution start determination process of the current negative torque control. In contrast, when determining that the increase amount per predetermined time of the accelerator operation amount ACC is greater than the preset accelerator operation amount determination value A (S23: YES), the controller 90 advances the process to step S24.

In step S24, the controller 90 sets the accelerator operation amount rapid increase flag, which indicates that the accelerator operation amount ACC has rapidly increased, to ON. Thereafter, the controller 90 advances the process to step S25. In step S25, the controller 90 starts measuring first measured time T1. Thereafter, the controller 90 advances the process to step S26.

In step S26, the controller 90 determines whether the first measured time T1 is less than or equal to the first predetermined time F1, which has been set in advance. The first predetermined time F1 is set to be slightly longer than the time lag from when the driver depresses the accelerator pedal 89 until the boost pressure P, which corresponds to the operation of the accelerator pedal 89, is reached.

When determining in step S26 that the first measured time T1 is greater than the first predetermined time F1 set in advance (S26: NO), the controller 90 advances the process to step S27. In step S27, the controller 90 sets the accelerator operation amount rapid increase flag to OFF. Thereafter, the controller 90 ends the execution start determination process of the current negative torque control.

In contrast, when determining in step S26 that the first measured time T1 is less than or equal to the first predetermined time F1 set in advance (S26: YES), the controller 90 advances the process to step S32. In the present embodiment, steps S21 to S27 constitute one of the execution conditions for executing the negative torque control.

In step S32, the controller 90 determines whether the boost pressure P has increased. The controller 90 determines that the boost pressure P has increased if the currently detected boost pressure P is greater than the previously detected boost pressure P. When determining in step S32 that the forced-induction pressure P has not increased (S32: NO), the controller 90 ends the execution start determination process of the current negative torque control. In contrast, when determining in step S32 that the boost pressure P has increased (S32: YES), the controller 90 advances the process to step S33.

In step S33, the controller 90 determines whether the increase amount per predetermined time of the boost pressure P is greater than a preset boost pressure determination value B. The increase amount per predetermined time of the boost pressure P is the absolute value of the difference between the currently detected boost pressure P and the previously detected boost pressure P. The boost pressure determination value B is set to such a value that the internal combustion engine 10 may be revved up after the boost pressure P is repeatedly increased at predetermined intervals for a certain time by the boost pressure determination value B each time. The boost pressure determination value B is obtained through experiments or simulations in advance.

When determining in step S33 that the increase amount per predetermined time of the boost pressure P is less than or equal to the preset boost pressure determination value B (S33: NO), the controller 90 ends the execution start determination process of the current negative torque control. In contrast, when determining in step S33 that the increase amount per predetermined time of the boost pressure P is greater than the preset boost pressure determination value B (S33: YES), the controller 90 advances the process to step S35. In the present embodiment, steps S32 and 33 constitute one of the execution conditions for executing the negative torque control.

In step S35, the motor controlling section 92 of the controller 90 starts the negative torque control by using the first motor generator 61. The negative torque control is a control to set the rotational torque applied to the crankshaft 14 of the internal combustion engine 10 by the first motor generator 61 to a negative value that is on the negative side of the value immediately before the start of the negative torque control. For example, if the first motor generator 61 was applying a positive rotational torque to the crankshaft 14 immediately before the start of the negative torque control (while assisting the internal combustion engine 10), the first motor generator 61 is controlled to apply a predetermined negative rotational torque in the negative torque control. Also, if the first motor generator 61 was applying a negative rotational torque to the crankshaft 14 immediately before the start of the negative torque control, that is, if the first motor generator 61 is generating power, the first motor generator 61 is controlled to apply a negative rotational torque shifted to the negative side by a certain value relative to the value immediately before the start of the negative torque control. That is, the negative torque control is a control to apply a rotational torque to the crankshaft 14 so as to reduce the engine rotational speed, which is the number of revolutions per unit time of the crankshaft 14 of the internal combustion engine 10. Also, in step S35, the controller 90 sets the negative torque control execution flag to ON and sets the accelerator operation amount rapid increase flag to OFF. Thereafter, the controller 90 ends the execution start determination process of the current negative torque control.

When determining in step S11 that the negative torque control execution flag is ON (S11: NO), the controller 90 advances the process to step S12. In step S12, the controller 90 determines whether a termination condition of the negative torque control is satisfied. The termination condition of the negative torque control is that the actual rotational speed of the internal combustion engine 10 enters a predetermined range from the target rotational speed of the internal combustion engine 10 while approaching the target rotational speed. When determining in step S12 that the termination condition of the negative torque control is not satisfied (S12: NO), the controller 90 ends the execution start determination process of the current negative torque control. In contrast, when determining in step S12 that the termination condition of the negative torque control is satisfied (S12: YES), the controller 90 advances the process to step S13.

In step S13, the motor controlling section 92 of the controller 90 ends the negative torque control by the first motor generator 61. The motor controlling section 92 of the controller 90 sets the negative torque control execution flag to OFF. Thereafter, the controller 90 ends the execution start determination process of the current negative torque control.

Next, the execution start determination process of a vibration suppression control by the first motor generator 61 will be described. The vibration suppression control is executed by the controller 90. The controller 90 repeatedly executes the execution start determination process of the vibration suppression control at predetermined intervals from when the system activation switch of the vehicle 100 is turned ON to activate the controller 90 until when the system activation switch is turned OFF so that the operation of the controller 90 ends. When the controller 90 starts operating, a vibration suppression control execution flag is OFF.

Figure 3:
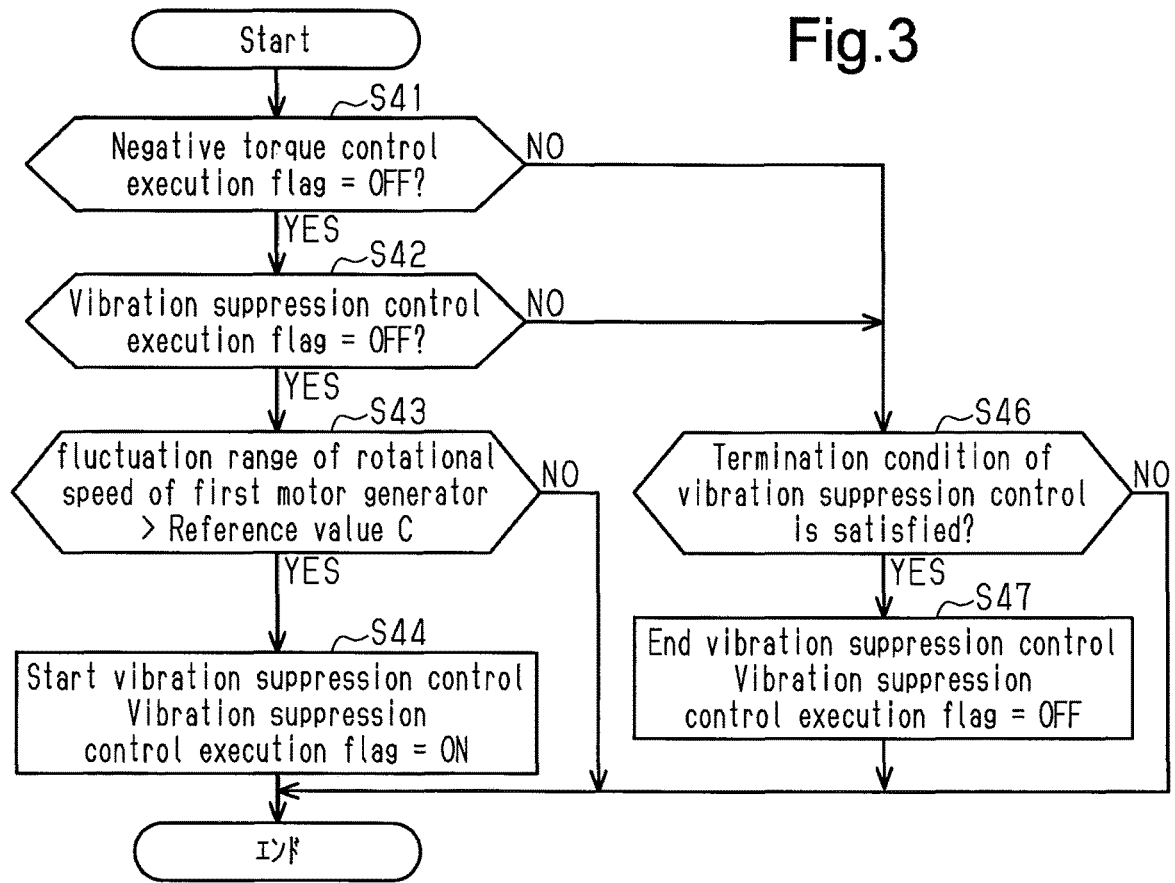
FIG. 3 is a flowchart showing an execution start determination process of a vibration suppression control.

As shown in FIG. 3, the controller 90 executes the process of step S41 when starting the execution start determination process of the vibration suppression control. In step S41, the controller 90 determines whether the negative torque control execution flag is OFF. When determining in step S41 that the negative torque control execution flag is OFF (S41: YES), the controller 90 advances the process to step S42.

In step S11, the controller 90 determines whether the vibration suppressing control execution flag is OFF. When determining in step S42 that the vibration suppression control execution flag is OFF (S42: YES), the controller 90 advances the process to step S43.

In step S43, the controller 90 determines whether the fluctuation range of the rotational speed of the output shaft of the first motor generator 61 is greater than a preset reference value C. The fluctuation range of the rotational speed of the output shaft of the first motor generator 61 refers to the range of fluctuation of the rotational speed from a point of inflection at which the rotational speed is changed from decrease (increase) to increase (decrease) to a point of inflection at which the rotational speed is changed from increase (decrease) to decrease (increase) within a predetermined time in a case in which changes over time of the rotational speed is observed. Also, the reference value C is defined as a frequency at which noise starts being generated between gears in the driving force distribution-integration mechanism 40 due to fluctuation of the rotational speed of the output shaft of the first motor generator 61. The reference value C is obtained by conducting tests and simulations in advance. When determining in step S43 that the fluctuation range of the rotational speed of the output shaft of the first motor generator 61 is less than or equal to the preset reference value C (S43: NO), the controller 90 ends the current execution start determination process of the vibration suppression control. In contrast, when determining in step S43 that the fluctuation range of the rotational speed of the output shaft of the first motor generator 61 is greater than the preset reference value C (S43: YES), the controller 90 advances the process to step S44.

In step S44, the motor controlling section 92 of the controller 90 starts the vibration suppression control by using the first motor generator 61. The vibration suppression control is a control to set the rotational torque applied to the crankshaft 14 of the internal combustion engine 10 by the first motor generator 61 to a negative value that is on the negative side of the value immediately before the start of the vibration suppression control. For example, if the first motor generator 61 was applying a positive rotational torque to the crankshaft 14 immediately before the start of the vibration suppression control, that is, when the first motor generator 61 is assisting the internal combustion engine 10, the first motor generator 61 is controlled to apply a negative rotational torque −X in the vibration suppression control. Also, if the first motor generator 61 was applying a negative rotational torque to the crankshaft 14 immediately before the start of the negative torque control, that is, if the first motor generator 61 is generating power, the first motor generator 61 is controlled to apply a negative rotational torque shifted to the negative side by −X relative to the value immediately before the start of the negative torque control. That is, the vibration suppression control is a control to apply a rotational torque to the crankshaft 14 so as to reduce the engine rotational speed, which is the number of revolutions per unit time of the crankshaft 14 of the internal combustion engine 10. Also, in the vibration suppression control, as the fluctuation range of the rotational speed of the output shaft of the first motor generator 61 increases, the above-mentioned −X is set to a smaller value, that is, a greater value on the negative side. This increases the negative rotational torque applied to the crankshaft 14 by the first motor generator 61. Also, the controller 90 sets the vibration suppression control execution flag to ON. Thereafter, the controller 90 ends the execution start determination process of the current vibration suppression control.

When determining in step S41 that the negative torque control execution flag is ON (S41: NO), the controller 90 advances the process to step S46. When determining in step S42 that the vibration suppression control execution flag is ON (S42: NO), the controller 90 advances the process to step S46.

In step S46, the controller 90 determines whether a termination condition of the vibration suppression control is satisfied. The termination condition of the vibration suppression control is that the negative torque control execution flag is ON or that the fluctuation range of the rotational speed of the output shaft of the first motor generator 61 is less than a termination reference value, which is less than the reference value C. The termination reference value is set in advance to such a value at which it can be determined that the fluctuation range of the rotational speed of the output shaft of the first motor generator 61 converges and the vibration or the like due to fluctuation of the rotational speed has decreased accordingly. When determining in step S46 that none of the termination conditions of the vibration suppression control is satisfied (S46: NO), the controller 90 ends the execution start determination process of the current vibration suppression control. In contrast, when determining in step S46 that at least one of the termination conditions of the vibration suppression control is satisfied (S46: YES), the controller 90 advances the process to step S47.

In step S47, the motor controlling section 92 of the controller 90 starts the vibration suppression control by using the first motor generator 61. Also, the controller 90 sets the vibration suppression control execution flag to OFF. Thereafter, the controller 90 ends the execution start determination process of the current vibration suppression control.

Next, a misfire determination process configured to determine a misfire occurring in the internal combustion engine 10 executed by the controller 90 will be described. In the misfire determination process, "intermittent misfire" is determined, which is defined as a misfire occurring in any of the cylinders 12 or a misfire occurring in one of the cylinders 12. The controller 90 repeatedly executes the misfire determination process at predetermined intervals from when the system activation switch of the vehicle 100 is turned ON to activate the controller 90 until when the system activation switch is turned OFF so that the operation of the controller 90 ends.

Figure 4:
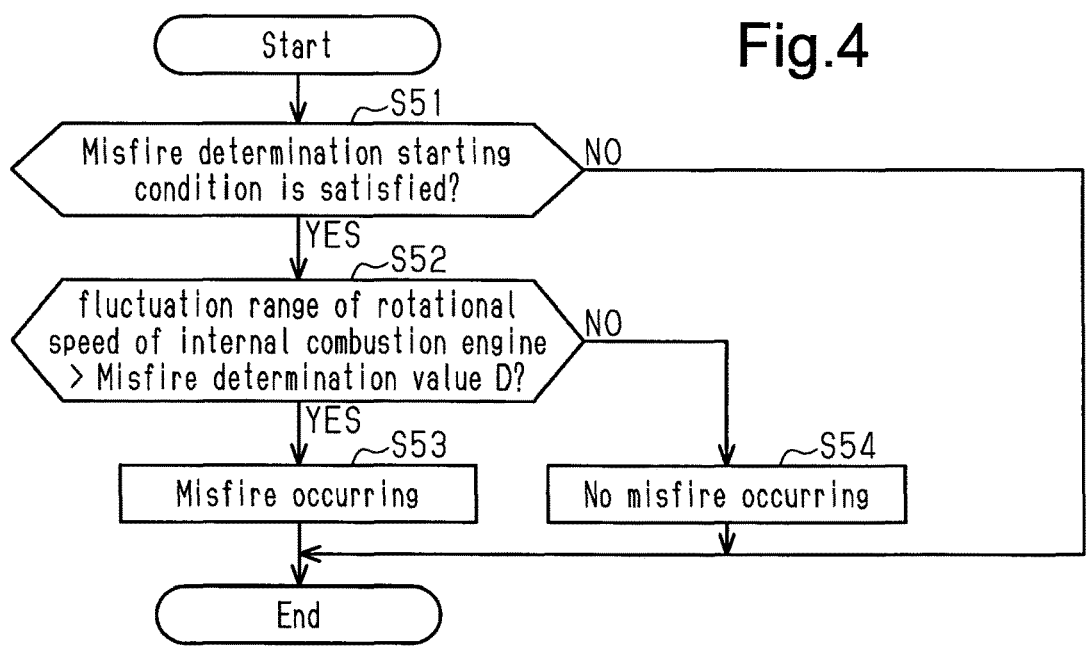
FIG. 4 is a flowchart showing a misfire determination process.

As shown in FIG. 4, the controller 90 executes the process of step S51 when starting the misfire determination process. In step S51, the controller 90 determines whether misfire determination starting condition is satisfied. The misfire determination starting condition includes a condition that the temperature of the cooling water for cooling the internal combustion engine 10 is greater than or equal to a predetermined temperature and a condition that the rotational speed of the internal combustion engine 10 is greater than or equal to a predetermined rotational speed. The misfire determination starting condition is a condition for determining that the conditions for properly executing the misfire determination of the internal combustion engine 10 are satisfied. When determining in step S51 that the misfire determination starting condition is not satisfied (S51: NO), the controller 90 ends the current misfire determination process. In contrast, when determining in step S51 that the misfire determination starting condition is satisfied (S51: YES), the controller 90 advances the process to step S52.

In step S52, the misfire determining section 93 of the controller 90 determines whether the fluctuation range of the rotational speed of the internal combustion engine 10 is greater than a misfire determination value D. The fluctuation range of the rotational speed of the internal combustion engine 10 refers to the range of fluctuation of the rotational speed from a point of inflection at which the rotational speed is changed from decrease (increase) to increase (decrease) to a point of inflection at which the rotational speed is changed from increase (decrease) to decrease (increase) within a predetermined time in a case in which changes over time of the rotational speed is observed. The misfire determination value D is a value for determining whether a misfire is occurring in the internal combustion engine 10 by comparing the misfire determination value D with the fluctuation range of the rotational speed of the internal combustion engine 10. The misfire determination value D is set to one of a changed value D1 and an initial value D2 depending on the situation. Specifically, when the controller 90 starts operation, the value of the misfire determination value D at an early stage is set to the initial value D2. The initial value D2 is set to the minimum fluctuation range of the assumed values of the fluctuation range of the engine rotational speed, which fluctuates when a misfire occurs in the internal combustion engine 10 in a state in which the misfire determination starting condition is satisfied and the first motor generator 61 is applying no negative rotational torque to the crankshaft 14 of the internal combustion engine 10. The initial value D2 is obtained by conducting tests and simulations in advance. When determining in step S52 that the fluctuation range of the rotational speed of the internal combustion engine 10 is greater than the misfire determination value D (S52: YES), the controller 90 advances the process to step S53.

In step S53, the misfire determining section 93 of the controller 90 determines that a misfire is occurring in the internal combustion engine 10. Thereafter, the controller 90 ends the current misfire determination process.

In contrast, when determining in step S52 that the fluctuation range of the rotational speed of the internal combustion engine 10 is less than or equal to the misfire determination value D (S52: NO), the controller 90 advances the process to step S54.

In step S54, the misfire determining section 93 of the controller 90 determines that no misfire is occurring in the internal combustion engine 10. Thereafter, the controller 90 ends the current misfire determination process.

Next, a misfire determination value changing process of changing the misfire determination value D in the misfire determination process executed by the controller 90 will be described. The controller 90 repeatedly executes the misfire determination value changing process at predetermined intervals from when the system activation switch of the vehicle 100 is turned ON to activate the controller 90 until when the system activation switch is turned OFF so that the operation of the controller 90 ends.

Figure 5:
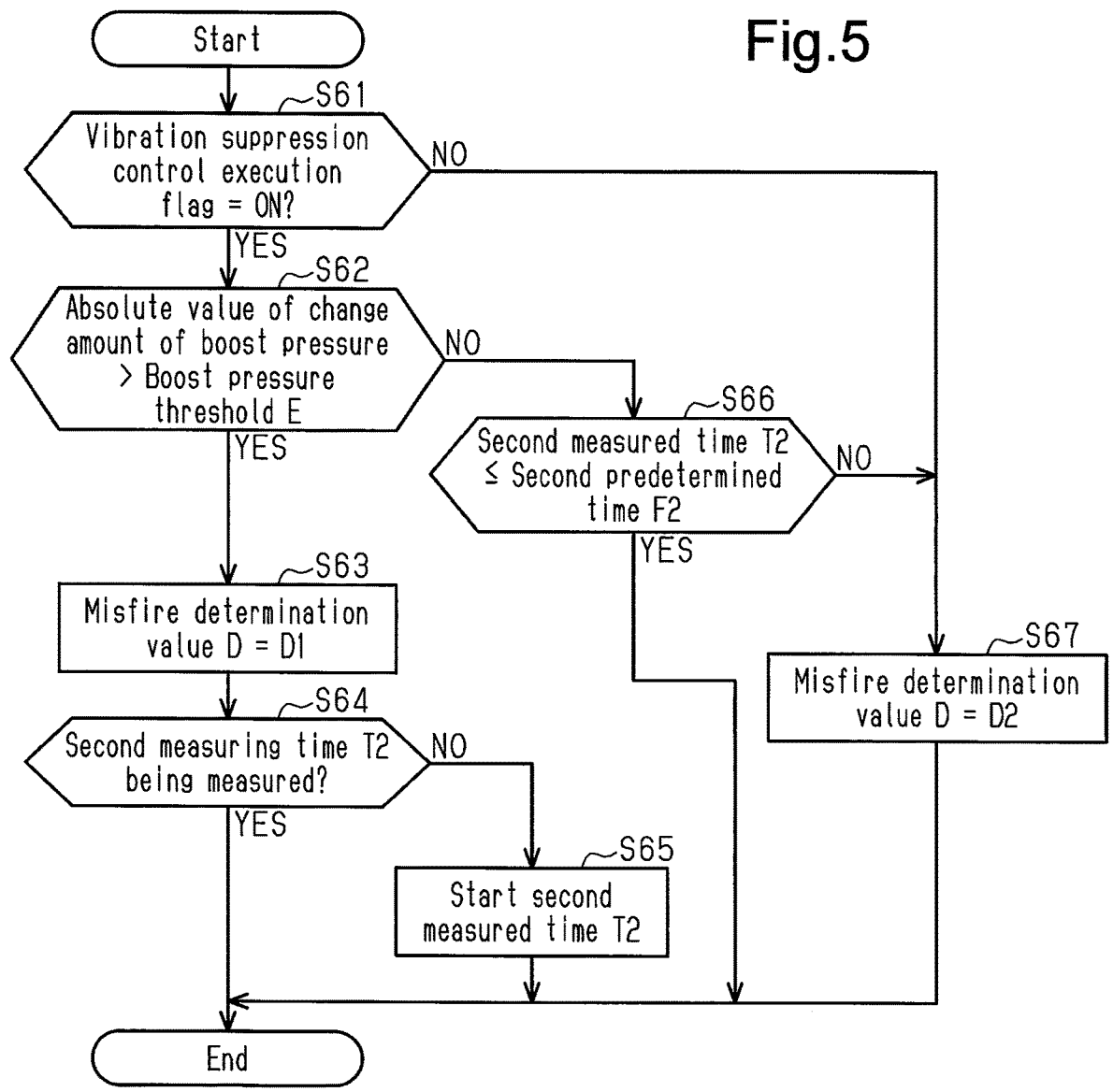
FIG. 5 is a flowchart showing a changing process of a misfire determination value.

As shown in FIG. 5, the controller 90 executes the process of step S61 when starting the misfire determination value changing process. In step S61, the controller 90 determines whether the vibration suppression control execution flag is ON. When determining in step S61 that the vibration suppression control execution flag is ON (S61: YES), the controller 90 advances the process to step S62.

In step S62, the controller 90 determines whether the absolute value of the change amount per predetermined time of the boost pressure P is greater than a preset boost pressure threshold E. The absolute value of the change amount per predetermined time of the boost pressure P is the absolute value of the difference between the currently detected boost pressure P and the previously detected boost pressure P. The boost pressure threshold E is set to such a value that the rotational speed of the internal combustion engine 10 may be excessively and rapidly increased or excessively rapidly decreased after the boost pressure P is repeatedly increased or decreased at predetermined intervals for a certain time by the boost pressure threshold E each time. The boost pressure threshold E is obtained through experiments or simulations in advance. In the present embodiment, the boost pressure threshold E is set to the same value as the boost pressure determination value B. When determining in step S62 that the absolute value of the change amount per predetermined time of the boost pressure P is greater than the preset boost pressure threshold E (S62: YES), the controller 90 advances the process to step S63.

In step S63, the misfire determining section 93 of the controller 90 changes the misfire determination value D in the misfire determination process to the changed value D1. The changed value D1 is set to the minimum fluctuation range of the assumed values of the fluctuation range of the engine rotational speed, which fluctuates when a misfire occurs in the internal combustion engine 10 in a state in which the first motor generator 61 is applying a negative rotational torque to the crankshaft 14 of the internal combustion engine 10. The changed value D1 is obtained by conducting tests and simulations in advance. When the first motor generator 61 is applying a negative rotational torque to the crankshaft 14, the fluctuation range of the engine rotational speed, which fluctuates when a misfire occurs in the internal combustion engine 10, is less than that in a case in which no negative torque is applied. Therefore, the changed value D1 is less than the initial value D2. Thereafter, the controller 90 advances the process to step S64.

In step S64, the controller 90 determines whether second measured time T2 is being measured. When determining in step S64 that the second measured time T2 is being measured (S64: YES), the controller 90 ends the current process of changing the misfire determination value.

In contrast, when determining in step S64 that the second measured time T2 is not being measured (S64: NO), the controller 90 advances the process to step S65. In step S65, the controller 90 starts measuring the second measured time T2. Thereafter, the controller 90 ends the current misfire determination value changing process.

When determining in step S62 that the absolute value of the change amount per predetermined time of the boost pressure P is less than or equal to the preset boost pressure threshold E (S62: NO), the controller 90 advances the process to step S66.

In step S66, the controller 90 determines whether the second measured time T2 is less than or equal to the second predetermined time F2, which has been set in advance. If the rotational speed of the internal combustion engine 10 rapidly increases or decreases due to increase or decrease in the forced-induction pressure P, the fluctuation range of the rotational speed of the output shaft of the first motor generator 61 tends to increase. Further, in the above-described vibration suppression control, as the fluctuation range of the rotational speed of the output shaft of the first motor generator 61 increases, the negative rotational torque applied to the crankshaft 14 by the first motor generator 61 is increased. The control to increase the negative rotational torque in the vibration suppression control is continued for a predetermined time, taking into consideration the fact that the fluctuation of the rotational speed of the output shaft of the first motor generator 61 continues even after the forced-induction pressure P becomes constant. Therefore, the second predetermined time F2 is set to such a time for which, after the negative rotational torque of the vibration suppression control increases due to increase or decrease in the boost pressure P, the negative rotational torque of the vibration suppression control is controlled by a great amount.

When determining in step S66 that the second measured time T2 is less than or equal to the second predetermined time F2, which has been set in advance (S66: YES), the controller 90 maintains the misfire determination value D in the misfire determination process. Thereafter, the controller 90 ends the current misfire determination value changing process.

In contrast, when determining in step S66 that the second measured time T2 is greater than the second predetermined time F2 set in advance (S66: YES), the controller 90 advances the process to step S67. When determining in step S61 that the vibration suppression control execution flag is OFF (S61: NO), the controller 90 advances the process to step S67.

In step S67, the misfire determining section 93 of the controller 90 changes the misfire determination value D in the misfire determination process to the initial value D2. Thereafter, the controller 90 ends the current misfire determination value changing process.

The operation and advantages of the present embodiment will now be described.

If the driver depresses the accelerator pedal 89 at a point in time t1 as shown in FIG. 6C, the accelerator operation amount ACC gradually increases between the point in time t1 and a point in time t2. When it is determined that the increase amount per predetermined time of accelerator operation amount ACC becomes greater than the accelerator operation amount determination value A set in advance at the point in time t2, the accelerator operation amount rapid increase flag is set to ON. In addition, the activation of the turbocharger 20 is started at the point in time t2, which is slightly after the point in time t1, at which the driver depressed the accelerator pedal 89. This gradually increases the boost pressure P in a section of the intake passage 11 on the downstream side of the compressor housing 21 between the point in time t2 and a point in time t3 as shown in FIG. 6D. Then, at the point in time t3, it is determined that the increase amount of the boost pressure P per predetermined time is greater than the boost pressure determination value B set in advance. Thereafter, the negative pressure control is executed between the point in time t3 and a point in time t4 as shown in FIG. 6E.

If the negative torque control is not executed, the rotational speed of the internal combustion engine 10 would overshoot and increase excessively after the point in time t3 as illustrated the long dashed double-short dashed line in FIG. 6A. Such an excessive increase in the engine rotational speed may shake and vibrate the vehicle and generate noise.

Specifically, in the present embodiment, since the driving force of the internal combustion engine 10 is transmitted from the crankshaft 14 of the internal combustion engine 10 to the driving force distribution-integration mechanism 40 via the damper 31, an excessive increase in the rotational speed of the internal combustion engine 10 excessively twists the damper 31. Such an excessive twisting of the damper 31 excessively increases the reaction force that acts to restore the original state of the damper 31. Repetition of such twisting and reaction force causes the driving force transmitted from the internal combustion engine 10 to the driving force distribution-integration mechanism 40 to be unstable, so that the driving force fluctuates in a vibrating manner. Then, when the rotational speed of the carrier 42 in the driving force distribution-integration mechanism 40 fluctuates, the pinion gears 43, which are supported by the carrier 42, and the sun gear 41 repeatedly separate from and collide with each other. In this manner, when the gears in the driving force distribution-integration mechanism 40 repeatedly collide with and separate from each other, noise may be generated between the gears.

In the present embodiment, the negative torque control, in which negative torque is applied to the crankshaft 14 by the first motor generator 61, is executed on condition that the increase amount per predetermined time of the boost pressure P has become greater than the preset boost pressure determination value B. As a result, when there is a possibility that the boost pressure P will increase rapidly and then the rotational speed of the internal combustion engine 10 will increase excessively, a negative rotational torque is applied to the crankshaft 14 of the internal combustion engine 10. Therefore, as indicated by the solid line in FIG. 6A, the increase in the rotational speed of the internal combustion engine 10 becomes moderate after the point in time t3, and excessive increase in the rotational speed is unlikely to occur. As a result, shaking, vibration, and noise of the vehicle caused by excessive increase in the rotational speed of the internal combustion engine 10 are limited.

Also, in the negative torque control of the present embodiment, a negative rotational torque is applied to crankshaft 14 of the internal combustion engine 10 from the first motor generator 61 via the driving force distribution-integration mechanism 40. Therefore, the first motor generator 61 applies, to the driving force distribution-integration mechanism 40, a rotational torque the direction of which is opposite to the direction in which the sun gear 41 is rotated by the driving force of the internal combustion engine that is transmitted from the pinion gears 43 supported by the carrier 42. That is, since the rotational torque is applied to the side where the sun gear 41 and the pinion gears 43 supported by the carrier 42 contact each other, the pinion gears 43 supported by the sun gear 41 and the carrier 42 are prevented from separating from each other. As a result, it is possible to suppress the generation of noise between the gears due to repeated collisions between the sun gear 41 and the pinion gears 43 supported by the carrier 42.

In the present embodiment, the execution conditions of the negative torque control include a condition that the increase amount per predetermined time of the accelerator operation amount ACC detected by the accelerator operation amount sensor 82 is greater than the preset accelerator operation amount determination value A. If the accelerator pedal 89 is operated abruptly by the driver as described above, it is likely that the rotational speed of the internal combustion engine 10 will increase excessively immediately thereafter. In this regard, the present embodiment employs, as one of the execution conditions of the negative torque control, the condition related to the increase amount of the accelerator operation amount ACC. This allows the negative torque control to be executed under appropriate situations and prevents the negative torque control from being executed unnecessarily.

In the present embodiment, the first motor generator 61 is employed as a torque applying mechanism that applies a rotational torque to the crankshaft 14 of the internal combustion engine 10. The first motor generator 61 assists the operation of the internal combustion engine 10 and generates power using the torque from the internal combustion engine 10. Therefore, the first motor generator 61 is able to be relatively finely controlled. As a result, the present embodiment is capable of properly controlling the negative rotational torque applied to the crankshaft 14 in the negative torque control.

If the negative torque control and the vibration suppression control are not executed after the point in time t3 as indicated by the long dashed double-short dashed line in FIG. 6B, the fluctuation range of the rotational speed of the output shaft of the first motor generator 61 is increased. In contrast, if the negative torque control is executed from the point in time t3 to the point in time t4 as indicated by the long dashed double-short dashed line in FIG. 6B, the fluctuation range of the rotational speed on the output shaft of the first motor generator 61 is smaller than that when the negative torque control is not executed. Thereafter, when the negative torque control is ended at the point in time t4, the fluctuation range of the rotational speed on the output shaft of the first motor generator 61 increases. Then, when it is determined at the point in time t5 that the fluctuation range of the rotational speed of the output shaft of the first motor generator 61 is greater than the preset reference value C, the vibration suppression control is executed from the point in time t5 to the point in time t6 as shown in FIG. 6F.

If the vibration suppression control is not executed, the fluctuation of the output shaft of the first motor generator 61 would continue even after the point in time t5 as indicated by the long dashed double-short dashed line in FIG. 6B. Thus, when the output shaft of the first motor generator 61 fluctuates, the rotational speed of the sun gear 41 connected to the output shaft of the first motor generator 61 fluctuates. When the rotational speed of the sun gear 41 fluctuates, the sun gear 41 and the pinion gears 43, which are supported by the carrier 42, repeatedly separate from and collide with each other. In this manner, when the gears in the driving force distribution-integration mechanism 40 repeatedly collide with and separate from each other, noise may be generated between the gears.

In this regard, the present embodiment executes the vibration suppression control by using the first motor generator 61 at the point in time t5 to apply a rotational torque in one direction to the output shaft of the first motor generator 61. Therefore, the first motor generator 61 applies, to the driving force distribution-integration mechanism 40, a rotational torque the direction of which is opposite to the direction in which the sun gear 41 is rotated by the driving force of the internal combustion engine that is transmitted from the pinion gears 43 supported by the carrier 42. That is, since the rotational torque is applied to the side where the sun gear 41 and the pinion gears 43 supported by the carrier 42 contact each other, the pinion gears 43 supported by the sun gear 41 and the carrier 42 are prevented from separating from each other. Then, as indicated by the solid line in FIG. 6B, the fluctuation range of the rotational speed of the output shaft of the first motor generator 61, which is coupled to the sun gear 41, changes to follow the rotational speed of the internal combustion engine 10 and decreases gradually.

However, when the vibration suppression control is executed in this manner, a negative rotational torque is applied to the crankshaft 14 of the internal combustion engine 10 by the first motor generator 61. As described above, when the first motor generator 61 is applying a negative rotational torque to the crankshaft 14 of the internal combustion engine 10, the fluctuation range of the rotational speed of the internal combustion engine 10 tends to be smaller. When the rotational speed of the internal combustion engine 10 fluctuates, the rotational speed of the internal combustion engine 10 repeatedly increases and decreases. When the vibration suppression control is executed, the crankshaft 14 receives a negative rotating torque when the rotational speed of the internal combustion engine 10 is changing to increase. Then, the crankshaft 14 of the internal combustion engine 10 receives a rotational torque in a direction to suppress increase in the rotational speed of the internal combustion engine 10. In contrast, when the rotational speed of the internal combustion engine 10 is changing to decrease, the negative rotational torque applied by the vibration suppression control is unlikely to act on the crankshaft 14. As a result, the vibration suppression control reduces the fluctuation range of the rotational speed of the internal combustion engine 10. If the fluctuation range of the rotational speed of the internal combustion engine 10 decreases in this manner, a misfire of the internal combustion engine 10 may not be properly determined even if the misfire is occurring.

In the present embodiment, when change conditions are satisfied, which include a condition that the vibration suppression control is being executed, the misfire determination value D is set to the changed value D1, which is smaller than the initial value D2 for the case in which the change conditions are not satisfied. Thus, in the present embodiment, the misfire determination value D is set to a relatively small value in a situation in which the fluctuation range of the rotational speed of the internal combustion engine 10 is likely to decrease, so that the misfire determination is readily executed. Accordingly, a misfire of the internal combustion engine is properly determined.

When the change amount per predetermined time of the boost pressure P is great, there is a high possibility that the rotational speed of the internal combustion engine 10 may increase or decrease rapidly. When the rotational speed of the internal combustion engine 10 increases or decreases rapidly, the rotational torque acting on the output shaft of the first motor generator 61 from the crankshaft 14 also changes rapidly. The fluctuation range of the rotational speed of the output shaft of the first motor generator 61 also tends to increase. In the vibration suppression control, if a great rotational torque is applied to the negative side in accordance with a great value of the fluctuation range of the rotational speed of the output shaft of the first motor generator 61, the crankshaft 14 will be pushed in the negative rotation direction by a corresponding amount. The fluctuation range of the rotational speed of the internal combustion engine 10 thus will become significantly small.

In the present embodiment, one of the change conditions of the misfire determination value D is that the change amount of the boost pressure P per predetermined time is greater than the preset boost pressure threshold value E. As a result, the misfire determination value D is set to a small value only under a situation where the fluctuation range of the rotational speed of the internal combustion engine 10 may become significantly small due to increase in the boost pressure P. The misfire determination value D is thus never set to a small value unnecessarily. This prevents an erroneous determination of a misfire in the internal combustion engine 10 from being made due to the misfire determination value D being unnecessarily set to a small value even though no misfire is occurring in the internal combustion engine 10.

The present embodiment may be modified as follows. The present embodiment and the following modifications can be combined as long as the combined modifications remain technically consistent with each other.

In the above-described embodiment, the turbocharger 20, which performs as a forced-induction device, may be replaced by a supercharger driven by rotation of the crankshaft 14 of the internal combustion engine 10. In this case, the super charger, which performs as a forced-induction device, only needs to compress and supply intake air from the intake passage 11 to the cylinders 12. Further, an electric forced-induction device may be employed.

In the above-described embodiment, the torque applying mechanism is not limited to the first motor generator 61. Any mechanism that is capable of applying a negative rotational torque to at least the crankshaft 14 of the internal combustion engine 10 can be employed as the torque applying mechanism that executes the above-described negative torque control. The mechanism that applies a negative rotational torque to the crankshaft 14 may be a friction brake mechanism for a member that rotates in conjunction with the crankshaft 14. The first motor generator 61 and the second motor generator 62 may be omitted if a friction brake mechanism is employed as the torque applying mechanism configured to execute the negative torque control.

In the above-described embodiment, the condition related to the increase amount of the accelerator operation amount ACC may be omitted from the execution conditions of the negative torque control. The processes of steps S21 to S27 in the execution start determination process of the negative torque control may be omitted. Even in this case, the negative torque control can be executed at an appropriate time if the condition related to the increase amount of the boost pressure P is used as one of the execution conditions of the negative torque control.

In the above-described embodiment, the misfire determination value changing process can be changed. For example, when the negative torque control is being executed, not only the fluctuation range of the rotational speed of the output shaft of the first motor generator 61 is suppressed, but also the fluctuation range of the rotational speed of the internal combustion engine 10 may decrease. Therefore, in the misfire determination value changing process, the misfire determination value D may be changed to a value smaller than the initial value D2 (for example, the changed value D1) even when the negative torque control execution flag is ON.

In the above-described embodiment, the change conditions of the misfire determination value changing process can be changed. As long as the rotational speed of the output shaft of the first motor generator 61 can fluctuate in a proper fluctuation range, the process of step S62 in the misfire determination value changing process may be omitted even if the rotational speed of the internal combustion engine 10 is not likely to rapidly increase or decrease.

In the above-described embodiment, the magnitude of the negative torque applied by the vibration suppression control can be changed. For example, the negative torque of the vibration suppression control may be constant regardless of the fluctuation range of the rotational speed of the output shaft of the first motor generator 61.

In the above-described embodiment, the magnitude of the negative torque applied by the negative torque control can be changed. In the negative torque control, the value of the rotational torque on the negative side may be increased as the fluctuation range of the rotational speed of the output shaft of the first motor generator 61 is increased. That is, in the negative torque control, the rotational torque may be changed to a value having a greater absolute value as the fluctuation range of the rotational speed of the output shaft of the first motor generator 61 is increased.

In the above-described embodiment, the vibration suppression control may be omitted. As described above, in the above-described embodiment, since the negative torque control prevents the internal combustion engine 10 from excessively revving up, fluctuation of the rotational speed of the output shaft of the first motor generator 61 due to excessive revving-up of the internal combustion engine 10 is unlikely to occur. From this point of view, there is no particular problem even if the vibration suppression control is omitted.

In the above-described embodiment, the misfire determination process may be omitted. For example, omitting the misfire determination process in the above-described embodiment has little effect if a misfire in the internal combustion engine 10 can be determined by a process other than the misfire determination process of the above-described embodiment. In this case, the misfire determination value changing process will be changed.

In the above-described embodiment, the misfire determination value changing process may be omitted. For example, the misfire determination value changing process can be omitted if the influence of the vibration suppression control and negative torque control on the fluctuation range of the rotational speed of the internal combustion engine 10 is small. In this case, the initial value D2 always needs to be used as the misfire determination value D in the misfire determination process.

A hybrid vehicle such as that disclosed in Japanese Laid-Open Patent Publication No. 2017-144979 includes a motor generator coupled to the crankshaft of the internal combustion engine. Such a hybrid vehicle executes a vibration suppression control to control the motor generator thereby applying, to the crankshaft, a rotational torque that has a negative value on the negative side of the value immediately before the start of the control on condition that the fluctuation range of the rotational speed of the output shaft of the motor generator is greater than a preset reference value. Also, in such a hybrid vehicle, it is determined that a misfire is occurring in the internal combustion engine on condition that the fluctuation range of the rotational speed of the internal combustion engine is greater than a preset misfire determination value.

When the vibration suppression control is being executed, not only the fluctuation range of the rotational speed of the output shaft of the motor generator is suppressed, but also the fluctuation range of the rotational speed of the internal combustion engine tends to decrease. If the fluctuation range of the rotational speed of the internal combustion engine decreases in this manner, a misfire of the internal combustion engine may not be properly determined even if the misfire is occurring.

From the viewpoint of appropriately determining a misfire of the internal combustion engine when the vibration suppression control is being executed, it is not always necessary to execute the negative torque control. That is, the execution of the negative torque control in the above-described embodiment may be omitted.

The controller 90 is not limited to a device that includes a CPU and a memory and executes software processing. For example, at least part of the processes executed by the software in the above-described embodiment may be executed by hardware circuits dedicated to execution of these processes (such as ASIC). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller configured to control a vehicle, wherein
    the vehicle includes
        an internal combustion engine including a forced-induction device,
        a boost pressure sensor that detects, as a boost pressure, a pressure in a section of an intake passage of the internal combustion engine on a downstream side of the forced-induction device, and
        a torque applying mechanism that applies a rotational to a crankshaft of the internal combustion engine,
    the controller comprising a controlling section configured to control the torque applying mechanism,
    the controlling section is configured to execute a negative torque control by using the torque applying mechanism when execution conditions are satisfied, the execution conditions including a condition that an increase amount per predetermined time of the boost pressure has become greater than a preset boost pressure determination value, and
    the negative torque control is a control to set the rotational torque applied to the crankshaft by the torque applying mechanism to a negative value that is on a negative side of a value immediately before start of the negative torque control.

2. The vehicle controller according to claim 1, wherein the execution conditions include a condition that an increase amount per predetermined time of an accelerator operation amount detected by an accelerator operation amount sensor is greater than a preset accelerator operation amount determination value.

3. The vehicle controller according to claim 1, wherein
    the vehicle includes, as the torque applying mechanism, a motor generator that is driveably coupled to the internal combustion engine, and
    the controlling section is a motor controlling section configured to control operation of the motor generator.

4. The vehicle controller according to claim 1, wherein
    the vehicle includes
        as the torque applying mechanism, a motor generator drivably coupled to the internal combustion engine, and
        a rotation sensor that detects a rotational speed of an output shaft of the motor generator,
    the controller comprises:
        a motor controlling section that is configured to execute a vibration suppression control on condition that the negative torque control is not being executed and a fluctuation range of the rotational speed of the output shaft of the motor generator detected by the rotation sensor is greater than a preset reference value; and
        a misfire determining section configured to determine a misfire of the internal combustion engine on condition that the fluctuation range of the rotational speed of the internal combustion engine is greater than a preset misfire determination value,
    the vibration suppression control is a control to set the rotational torque applied to the crankshaft by the motor generator to a negative value that is on a negative side of a value immediately before start of the vibration suppression control, and
    the misfire determining section is configured to change the misfire determination value to a smaller value when change conditions are satisfied than when the change conditions are not satisfied, the change conditions including a condition that the negative torque control or the vibration suppression control is being executed.

5. The vehicle controller according to claim 4, wherein
    the vibration suppression control causes a negative rotation torque to be greater on the negative side as the fluctuation range of the rotational speed of the output shaft of the motor generator increases, and
    the change conditions include a condition that a change amount per predetermined time of the boost pressure has become greater than a preset boost pressure threshold.

6. The vehicle controller according to claim 1, wherein the vehicle includes
    the internal combustion engine,
    a damper that is coupled to the crankshaft of the internal combustion engine to suppress vibration of the crankshaft,
    a gear mechanism that is coupled to the damper and transmits a driving force of the internal combustion engine via a plurality of gears, and
    a motor generator that performs as the torque applying mechanism coupled to the gear mechanism.

7. A vehicle controller configured to control a vehicle, wherein the vehicle includes
- an internal combustion engine including a forced-induction device,
- a motor generator drivably coupled to the internal combustion engine, the motor generator performing as a torque applying mechanism that applies a rotational to a crankshaft of the internal combustion engine, and
- a rotation sensor that detects a rotational speed of an output shaft of the motor generator, the controller comprises:
- a motor controlling section that is configured to execute a vibration suppression control on condition that a fluctuation range of the rotational speed of the output shaft of the motor generator detected by the rotation sensor is greater than a preset reference value; and
- a misfire determining section configured to determine a misfire of the internal combustion engine on condition that the fluctuation range of the rotational speed of the internal combustion engine is greater than a preset misfire determination value, the vibration suppression control is a control to set the rotational torque applied to the crankshaft by the motor generator to a negative value that is on a negative side of a value immediately before start of the vibration suppression control, and the misfire determining section is configured to change the misfire determination value to a smaller value when change conditions are satisfied than when the change conditions are not satisfied, the change conditions including a condition that the vibration suppression control is being executed.

* * * * *